(12) United States Patent
Li

(10) Patent No.: US 7,395,255 B2
(45) Date of Patent: Jul. 1, 2008

(54) DATA MANAGEMENT SYSTEM HAVING A COMMON DATABASE INFRASTRUCTURE

(75) Inventor: Dennis Fuk-Kuen Li, Troy, MI (US)

(73) Assignee: General Motors Corporation, Detroit, MI (US)

( * ) Notice: Subject to any disclaimer, the term of this patent is extended or adjusted under 35 U.S.C. 154(b) by 1165 days.

(21) Appl. No.: 10/243,295

(22) Filed: Sep. 13, 2002

(65) Prior Publication Data

US 2004/0054675 A1    Mar. 18, 2004

(51) Int. Cl.
*G06F 7/00*    (2006.01)

(52) U.S. Cl. ............................................. 707/2; 707/10

(58) Field of Classification Search ........... 707/1–104.1
See application file for complete search history.

(56) References Cited

U.S. PATENT DOCUMENTS

| | | | | |
|---|---|---|---|---|
| 5,758,351 A * | 5/1998 | Gibson et al. | ............. | 707/104.1 |
| 6,731,625 B1 * | 5/2004 | Eastep et al. | ................. | 370/352 |
| 6,859,821 B1 * | 2/2005 | Ozzie et al. | ................. | 709/205 |
| 2002/0049603 A1 * | 4/2002 | Mehra et al. | ................... | 705/1 |
| 2002/0049749 A1 * | 4/2002 | Helgeson et al. | ............... | 707/3 |
| 2002/0049788 A1 * | 4/2002 | Lipkin et al. | ................. | 707/513 |
| 2002/0064149 A1 * | 5/2002 | Elliot et al. | .................. | 370/352 |
| 2002/0161859 A1 * | 10/2002 | Willcox et al. | .............. | 709/219 |
| 2003/0033379 A1 * | 2/2003 | Civanlar et al. | ............. | 709/218 |
| 2003/0217105 A1 * | 11/2003 | Zircher et al. | ............... | 709/205 |

* cited by examiner

*Primary Examiner*—Don Wong
*Assistant Examiner*—Linh Black

(57) ABSTRACT

A data management system for use in accessing a plurality of diverse and distributed data sources over a computer network. Within the system, data from the data sources is represented by common data objects that encapsulate the actual data along with the methods and properties needed for use of the data. The system includes a common data model, a plurality of service managers, and a data services coordinator that coordinates operation of the service managers in utilizing the common data model to instantiate the common data objects that represent the data being accessed. The service managers include at least one data access manager for creation of the common data objects and a plurality of ancillary service managers that each provide one or more data service functions such as, for example, meta-data management, data management, data versioning, data transport, data update notification, data security, data presentation, and data translation.

23 Claims, 12 Drawing Sheets

Tire Models

Company A

| Tire Size | Test Id | Load | Load % | F (1) | F (4) | F (Max) | FEM Model |
|---|---|---|---|---|---|---|---|
| P265/70R17 | 15454 | 4747 | 50 | 0.276 | 0.791 | 1.090 | x23.jpg |
| P265/70R17 | 15454 | 7595 | 80 | 0.237 | 0.703 | 0.976 | x23.jpg |
| P265/70R17 | 15454 | 9494 | 100 | 0.202 | 0.622 | 0.897 | x23.jpg |
| P265/70R17 | 15456 | 4747 | 50 | 0.280 | 0.801 | 1.090 | x23.jpg |
| P265/70R17 | 15456 | 7595 | 80 | 0.240 | 0.711 | 0.977 | x23.jpg |
| P265/70R17 | 15456 | 9494 | 100 | 0.205 | 0.629 | 0.898 | x23.jpg |
| 235/45R17 | 15457 | 2305 | 50 | 0.315 | 0.867 | 1.069 | x24.jpg |
| 235/45R17 | 15457 | 2687 | 80 | 0.320 | 0.888 | 1.083 | x24.jpg |
| 235/45R17 | 15457 | 4609 | 100 | 0.316 | 0.886 | 1.067 | x24.jpg |
| 235/45R17 | 15458 | 2305 | 50 | 0.317 | 0.863 | 1.070 | x24.jpg |

| Graph | TEST NUMBER | TEST ID | SERIAL NUMBER | LOAD | LOAD % | F (1) | F (4) | F (MAX) |
|---|---|---|---|---|---|---|---|---|
| | 9164 | 15454 | M6388 | 4747 | 50 | 0.276 | 0.791 | 1.090 |
| 📊 | 9164 | 15454 | M6388 | 7595 | 80 | 0.237 | 0.703 | 0.976 |
| | 9164 | 15454 | M6388 | 9494 | 100 | 0.202 | 0.622 | 0.897 |
| | 9166 | 15456 | M6388 | 4747 | 50 | 0.280 | 0.801 | 1.090 |
| 📊 | 9166 | 15456 | M6388 | 7595 | 80 | 0.240 | 0.711 | 0.977 |
| | 9166 | 15456 | M6388 | 9494 | 100 | 0.205 | 0.629 | 0.898 |

DATA MANAGEMENT SYSTEM HAVING A COMMON DATABASE INFRASTRUCTURE

TECHNICAL FIELD

This invention relates to data management systems used in connection with diverse and distributed databases and to the interfacing of such databases to engineering and other business applications.

BACKGROUND OF THE INVENTION

The engineering of an automotive vehicle involves the development, test, and integration of a variety of complex vehicle systems. Quite often, entire divisions of automotive companies and their larger suppliers are devoted to a single one of these vehicle systems. Powertrain, suspension, and chassis are three such examples; steering is another. Today, engineering of the vehicle and the integration of these systems is heavily reliant on the use of computers, with computer-aided engineering, design, analysis, manufacture, and test programs becoming more and more widely used. These computer-aided tools all use data, some of which may come from databases, and produce data, some of which may be used by subsequent computer-based tools to further the overall engineering process. As the quantity and diversity of data in this engineering environment continues to increase, and as the ability of these tools to utilize that engineering data continues to increase, the complexity involved in managing the data also increases, both in terms of accessing the data and converting the data structures (and formats) that are usable by any particular computer-based tool. This is especially true where the source data comes not simply from relational databases, but from other data sources such as spreadsheets, documents of all types, legacy databases, and proprietary files produced by computer-based tools and automated test equipment. Such data is not only diverse in its structure, but is often highly distributed over various networks that may only be connected together via a global public network such as the Internet or a VPN implemented across the Internet.

The problem is further complicated by the need to accommodate the different platforms available to the end users in running a particular engineering application. For example, particular computer-based engineering packages may be deployed both directly on user workstations and separately via a web interface. This requires the ability to deliver the same types of data through different user interfaces.

SUMMARY OF THE INVENTION

The invention provides a data management system for accessing a plurality of data sources. The system is implemented over a computer network and includes a common data model, a plurality of service managers, and a data services coordinator that coordinates operation of at least some of the service managers in utilizing the common data model to instantiate a common data object that is then used to supply the requested data. For this purpose, the common data model includes a data class having a plurality of attributes defining properties of the data class. The service managers include at least a data access manager and an ancillary service manager, wherein the data access manager is operable to access the common data model and to access data from one or more of the data sources for use in instantiating the common data object containing the accessed data. The ancillary service manager is operable to provide a data service function such as, for example, meta-data management, data management, data versioning, data transport, data update notification, data security, data presentation, and data translation. Preferably, interface modules, also referred to as plug-ins, are used to interface particular data source types to the data access manager. These plug-ins can also be used in connection with other of the various service managers to handle the different types of formats involved in sharing and transporting the data.

The common data model can include subclasses of the data class directed to particular data types, each having their own sets of attributes as are necessary to properly represent the data originating from or being written to the data sources. Each time a data access request is made, the system determines the appropriate common data object needed and creates an instance of that object which persists until no longer needed. This creation and consumption of the common data objects as a part of data access (whether for reading or writing purposes) allows for data federation in a manner that provides data format and location transparency to diverse, distributed databases. It also enables the system to compose different data views from data obtained from different data sources, even if the data models for the different data are not the same.

BRIEF DESCRIPTION OF THE DRAWINGS

A preferred exemplary embodiment of the invention will hereinafter be described in conjunction with the appended drawings, wherein like designations denote like elements, and wherein.

DETAILED DESCRIPTION OF THE PREFERRED EMBODIMENTS

The data management system described herein and shown in the attached drawings provides a common data infrastructure that permits integration of various computer-based engineering tools in a manner that provides data source and location transparency. Reusable services and components simplify the integration of both new and old engineering tools into the system, and the use of a common data model permits the computer-based tools to be interfaced with the system using adapters that need only be designed for integration with the common data model. Particular data formats and structures can then be obtained using the reusable services and components.

Figure 1:
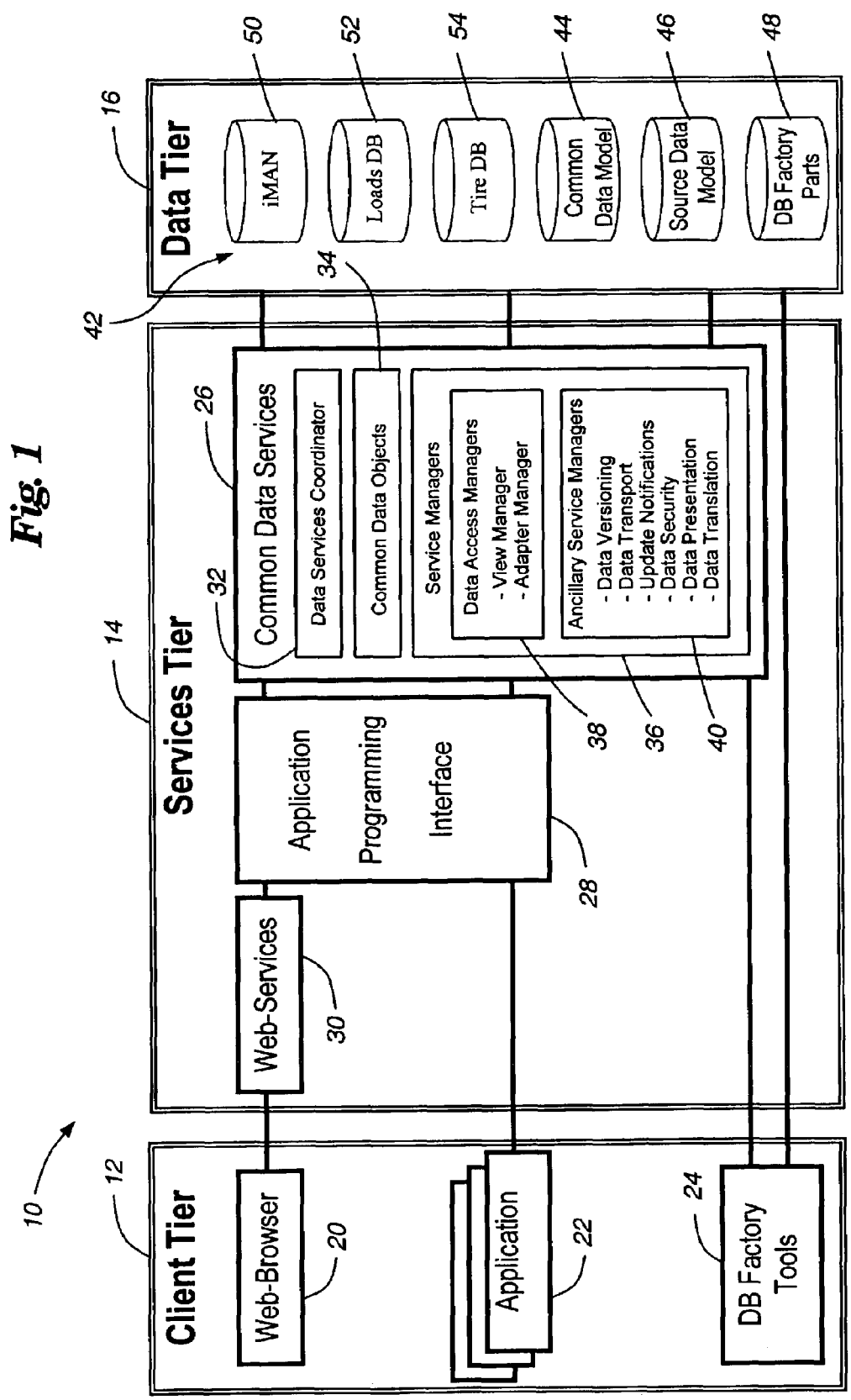
FIG. 1 is an overview of an embodiment of a data management system of the present invention.

Referring now to FIG. 1, there is shown an overview of the hierarchical structure of a data management system (DMS) 10 constructed in accordance with the invention. The DMS 10 is organized architecturally into a three tiered system involving an upper level client tier 12, a middle services tier 14, and a lowest level data tier 16. The client tier 12 includes three basic developer and end user tools; namely, a web interface such as a standard web browser 20, a set of general and special purpose application programs 22, and a set of database factory tools 24. The services tier 14 includes a set of common data services (CDS) 26 responsible for carrying out data requests involving accessing and supplying data that is either requested or supplied by the various user applications and, as will be discussed below, the common data services 26 processes the data by instantiating common data objects (CDOs) based on a common data model and then utilizing the CDOs to carry out the particular data request. As indicated in FIG. 1, the common data services includes a data services coordinator (DSC) 32, the common data objects 34 themselves, and a number of services managers 36 which are separated into both data access managers 38 and ancillary service managers 40. Also included in the services tier 14 is an application programming interface (API) 28 (that can be implemented as a part of the data services coordinator 32), and a web-services interface 30 that provides web-enabled access to the data via the API 28 and CDS 26. The data tier 16 includes data sources 42, the common data model 44, one or more source data models 46, and database factory parts or components 48 that are accessible by the database factory tools 24 for use in integrating new applications or data sources into the system 10.

In general, an end user will utilize either the web browser 20 or the application tools 22 themselves to carry out the desired engineering tasks, and all data flows to and from the user will go through the CDS 26 with common data objects 34 being created and consumed as necessary to carry out the particular engineering task involved. Not shown in the figure, the user can also access a third party computer-aided tools via the browser 20 in the event a web interface to the application tools is available. For data lookups, comparisons, charting, and the like that does not require specialized tools, the browser 20 can be used to carry out the particular task. An example of this use of the browser is depicted in FIGS. 10-13 and is discussed further below.

The data management system (DMS) 10 is implemented over a computer network of interconnected computers, which can be a local area network, a wide area network, a global public network such as the Internet, or a virtual private network (VPN) implemented over a larger network such as the Internet. DMS 10 is particularly advantageous when used in conjunction with latter two of these networks using diverse and distributed databases since it provides commonality among all data from whatever source and provides transparency of data location. This data location transparency means that the user application need not know where the database is; rather, only the common data services 26 needs this information since it handles all of the data management through the use of the CDOs 34. The common data services 26 are each implemented as one or more computer programs executed on at least one computer on the network. More specifically, the common data services are implemented using an EJB (enterprise javabeans) architecture, although other server-side component management system architectures could be used as well. Some of the common data services will be carried out as separate processes on a shared computer, whereas others may be implemented on a computer dedicated to the particular task. Alternatively, some or all of the common data services can be distributed across multiple computers, if necessary or desirable.

Browser 20 access to data is handled through a set of web services 30 which includes such things as an HTTP/HTTPS (Hypertext Transport Protocol) server that provides a web interface through the use of applets, servlets, asp pages, and the like. These can be implemented using Netscape™ Enterprise, Microsoft™ Internet Information Server (IIS), or Apache™ servers. The web services 30 interface with the common data services 26 via API 28. The implementation and use of API 28 and the various web services 30 is well within the level of skill in the art and will not be further elaborated upon here. The common data services 26 lie at the heart of the DMS 10, with all data accesses flowing through this centralized servicing function. The data services coordinator (DSC) 32 is the main EJB server entry point into the system and is used to coordinate the activities of the service managers so that a data request receives all of the necessary and appropriate servicing. This servicing includes the functions provided by the data access managers 38 which are responsible for obtaining needed data from the data sources 42 and instantiating the CDOs using that data. This servicing also includes the data service functions provided by some or all of the ancillary service managers 40, including in particular data security (authentication and authorization) and data presentation. The data sources themselves can include a variety of different sources of information, including relational databases, documents and document archives, spreadsheets, image files, as well as other multi-database management systems such as iMAN™. Three such examples are shown in FIG. 1, including an iMAN™ database 50, a loads database 52, and a tire database 54, the latter two of which comprise relational databases.

Figure 2:
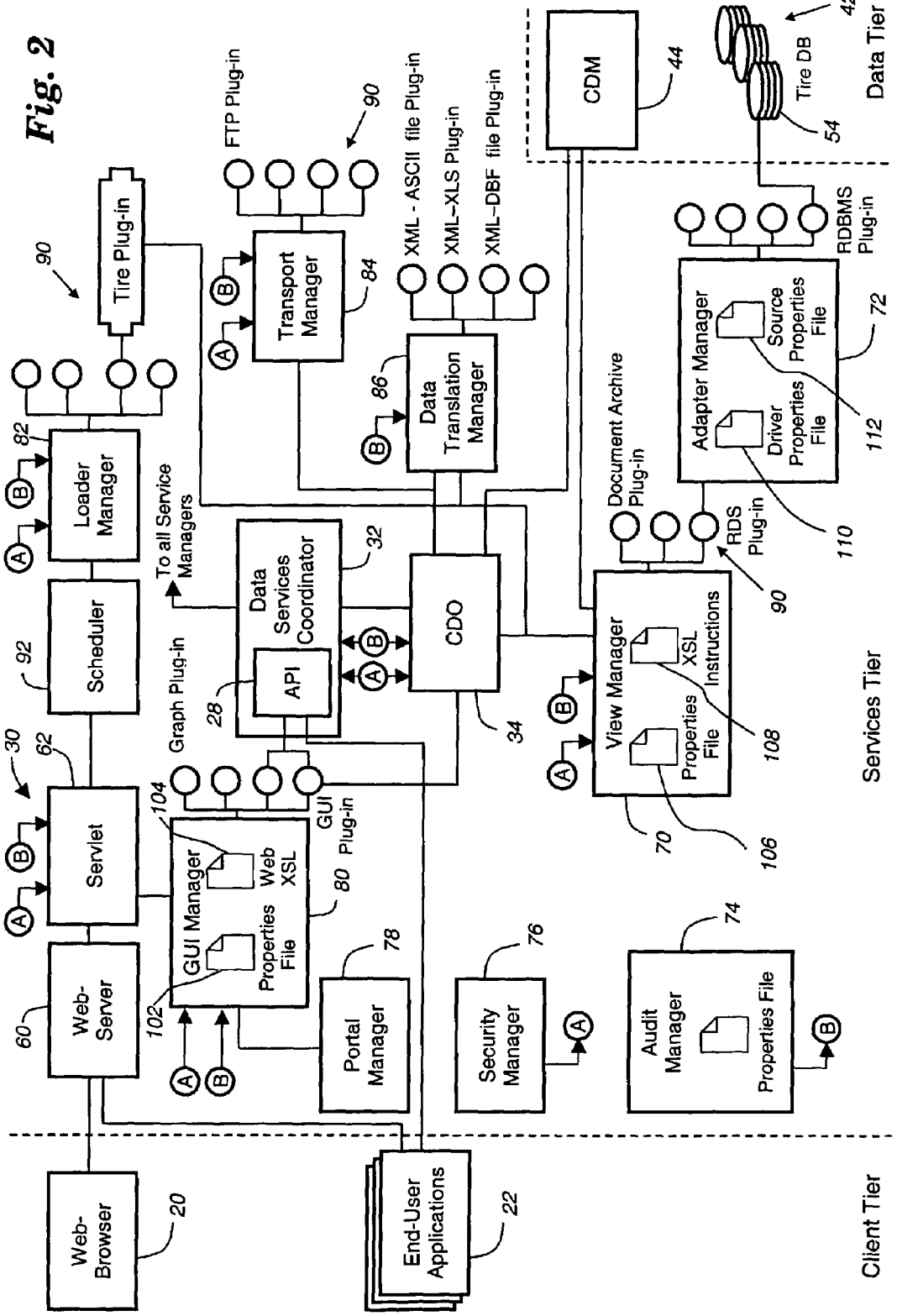
FIG. 2 is a block diagram depicting the logical architecture of the system of FIG. 1.

Referring now to FIG. 2, this generalized architecture of FIG. 1 is shown in greater detail to more fully depict the structure of DMS 10. As described above, web browser access into the system 10 is by way of a web server 60 running servlets 62 and/or other processes for handling data requests and display. Data requests are passed through to the data services coordinator (DSC) 32 which provides management of the overall processing, including data security services, accesses to the source data, creation of appropriate CDOs 34, any data transformations required, and finally presentation back to the user. Data handling through the system 10 is accomplished using XML (Extensible Markup Language) with the data being converted into and out of that format as necessary when it passes through the system between the data sources and end user. Generally, CDS 26 is made up of a group of service managers 36 each responsible for a certain data task, including the two categories of such tasks shown in FIG. 1—data access and ancillary services. The service managers 36 include two data access managers—a view manager 70 and a data source adapter manager 72—and several ancillary services managers—an audit manager 74, security manager 76, portal manager 78, GUI manager 80, loader manager 82, transport manager 84, and translation manager 86. These service managers 36 are interfaced, or extended, through the use of plug-ins 90 which are interface modules designed to interface the communications structure (e.g., command set) of its associated service manager with the various services connected to it. The plug-ins 90 are used to interface with the view manager 70, data source adapter manager 72, GUI (Graphical User Interface) manager 80, loader manager 82, transport manager 84, and translation manager 86.

The audit manager 74 provides data versioning services that permits maintenance of relationships between old and new data, and can be used to provide check-in and check-out capabilities through data sources that provide the service (e.g., the iMAN™ data source 50 or others such as Domino™). This also enables the system to provide update notifications concerning changes in data, and these notifications can be supplied using, for example, a subscription service. Audit manager 74 additionally provides event logging and can be used to provide recordkeeping and reporting services concerning the data management and user accesses, and this information can be used for such things as cost allocation among different enterprise cost centers. This service manager 74 is interfaced with each of the other managers identified by the connection Ⓑ.

Security manager 76 provides authentication and authorization for particular data requests received by the system and interfaces with each of the other managers identified by the connection Ⓐ. For a smaller, simpler computer network, this security can be implemented in connection with the authentication services provided by the workstation or network operating system, such as is used by WindowsNT™ based computers and networks. For larger organizations, this security can utilize the enterprise security schema and can be integrated with supplier collaboration and product data security schemas through, for example, LDAP and WebSeal™ protocols. If desired, authorization and authentication services can be implemented via application specific plug-ins 90 (not shown). For example, authentication can be provided via a plug-in used to interface the system to a CORBA or J2EE application server (such as BEA WebLogic™ or iPlanet™). Authorization can also be provided as a separate plug-in that provides web user to database user mappings.

Portal manager 78 supplements operation of the GUI manager 80 by providing information for customizing the user interface generated by GUI manager 80. As indicated in FIG. 2, GUI manager 80 utilizes display attributes contained in one or more properties files 102 along with XML style sheets (XSL) 104 used to produce the web-based presentation of data displayed on the browser 20. The properties files 102 and/or style sheets 104 can be specific to particular CDOs or data formats, or to particular databases and/or end user applications. GUI manager 80 is interfaced with the data services coordinator (DSC) 32 via one or more GUI plug-ins 90 designed to work with the API 28 contained within DSC 32. Other GUI plug-ins 90 can be used, such as ones that provide: forms handling to create HTML (Hypertext Markup Language) forms supporting data entry; file uploading to provide an interface for uploading documents from a browser; graphing capability to convert the data to and from XML; meta-data handling to provide XML meta-data in HTML; parameterized functionality to permit instantiation of CDOs that utilize input parameters; repository functionality to provide the ability to view database schema and meta-data; static HTML access to HTML files; XML content transformations using XSL style sheets.

Loader manager 82 uses plug-ins 90 that may be database-specific to schedule and batch load data. The web services 30 communicate not only with the DSC 32 to process user data requests, but also with a scheduler 92 that works with the loader manager 82 to provide scheduling of tasks such as batch processing. Once a scheduled task is initiated, the loader manager 82 interfaces through an appropriate plug-in 90 to the view manager 70 to initiate the creation and use of the CDOs 34 needed to carry out the task, with any data format translation being handled by the translation manager 86 via a plug-in 90 appropriate for the data format involved (e.g., ASCII or .xls spreadsheet). An exemplary tire plug-in 90 is depicted in FIG. 2 such as might be utilized in conjunction with the tire database 54. Instantiation of CDOs and translation of data according to the schedule set by the scheduler 92 is controlled via the DSC 32 and is carried out using the data access managers; that is, using the view manager 70 and source data adapter manager 72.

Transport manager 84 is responsible for moving data between computer systems using standard Internet protocols such as FTP and HTTP. It utilizes plug-ins 90 to support each of these different communication protocols. Thus, although for example, data may ultimately come from one of the data sources 42 shown in FIG. 2 (e.g., the tire database 54), it may involve the use of transport manager 84 to carry out the data transfer using the protocol supported at the computer system where the database is actually stored.

Translation manager 86 provides data transformations from one format to the other to facilitate the exchange of data between engineering applications. In particular, this translation manager 86 converts data from whatever format into a standardized data descriptor using, for example, XML. Thus, it utilizes plug-ins 90 that provide this translation between XML and, for example, ASCII, .xls spreadsheets, and database file formats. Translation capabilities other than format translations can also be provided by these plug-ins such as, for example, Fourier transforms and other such mathematical transforms for use with mathematical data.

The above-described service managers 74-86 are ancillary service managers in that they each perform one or more data service functions that are ancillary to the data access and CDO creation handled by the data access service managers 70, 72. The service functions identified above for these service managers can be implemented in one more ways that will be known to those skilled in the art.

The data access managers of FIG. 2 include the view manager 70 and data source adapter manager 72. View manager 70 responds to data requests by an end user application 22 or via the browser 20 and determines what data from which data source 42 is being requested. Then, using the common data model (CDM) 44, it instantiates the common data objects (CDOs) 34 used to represent the requested data within the system. CDM 44 can be implemented using object oriented programming as one or more data classes having a plurality of attributes that define the properties of the data class. These properties includes such things as the data structures, types, lengths, and values. In addition to the properties of the data it represents, each data class can have one or more methods for handling the attributes defined by the class. Each data class can also have subclasses directed to particular species of the more generic data class, and will typically have the general characteristics of encapsulation, inheritance, and polymorphism. The CDOs 34 are instances of a class or subclass defined by CDM 44 and are created and consumed by the system in response to particular data requests. That is, a data request coming from an end user application 22 or browser 20 is used by the view manager to create a CDO 34 which is then processed as needed or desired and returned for display via the settings provided by GUI manager 80. Once this has been completed, the CDO is deleted. Such data requests will typically be to obtain and return data from a data source 42, although they may instead be made for the purpose of writing new data to a data source. The view manager 70 utilizes one or more properties files 106 along with style sheet instructions 108 to create the desired view (CDOs) needed for a particular data request.

Figure 3:
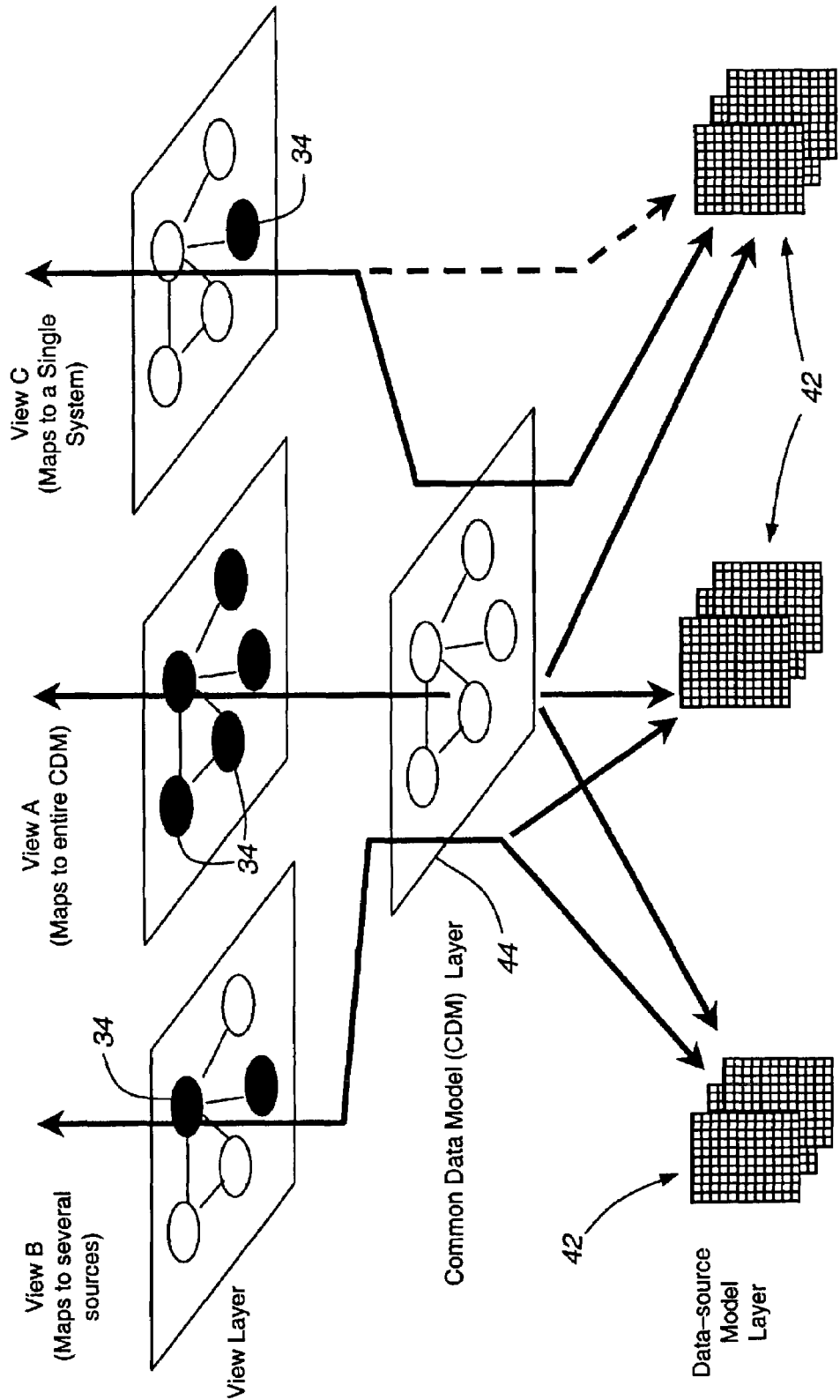
FIG. 3 depicts three exemplary data views that can be obtained using the system of FIG. 1.

Referring now briefly to FIG. 3, an example of the use of view manager 70 is shown. By encapsulating all data moving through the system as CDOs, the system can be integrated with different types of data sources, including legacy systems, new database applications, as well as ones accessible through a separate data management system such as iMAN™. In the example of FIG. 3, the view manager, acting through the CDM 44, creates three CDOs 34 that represent three different views of enterprise data from the data sources 42. Each of the three CDOs have been created and consumed as a result of three different end user data requests. View A results in a collection of CDOs that collectively map to the entire CDM 44 involving all of the different types of data held by the different data sources. View B maps to several data sources, and View C maps to a single data source. As will be appreciated, the data locations are therefore transparent to the end user and diverse (heterogeneous) data sources are thereby federated into a common model to permit access by any end user application or browser. Using the overall coordination control provided by DSC 32, multiple CDOs 34 can be created and consumed concurrently.

With continued reference to FIG. 2, data source adapter manager 72 can be one of several such adapter managers used to handle data extraction from a particular type of data source. In the example shown, the adapter manager 72 is used for relational database data access and interfaces with the view manager 70 via a relational database plug-in 90. Other such plug-ins and data source adapter managers can be included for other data source types, such as a document archive, 3-D modeling files, etc. View manager plug-ins can also be used to provide: file functionality for creation and processing of XML used to wrap files; repository functionality for creation and processing of XML content of schema and meta-data; and XML data service for creation and processing of XML content to and from the data sources 42. Adapter manager 72 itself includes one or more driver properties files 110 and source properties files 112. The driver properties file 110 defines the properties of the output format used by the adapter manager 72 to interface with the view manager 70 via the RDB plug-in 90. The source properties files 112 likewise include the data source-specific properties of the source data accessed by the adapter manager. This data extraction by the adapter manager 72 from the various data sources 42 is also by way of plug-ins 90—in this case, relational database management system plug-ins that are data source-specific.

Figure 4:
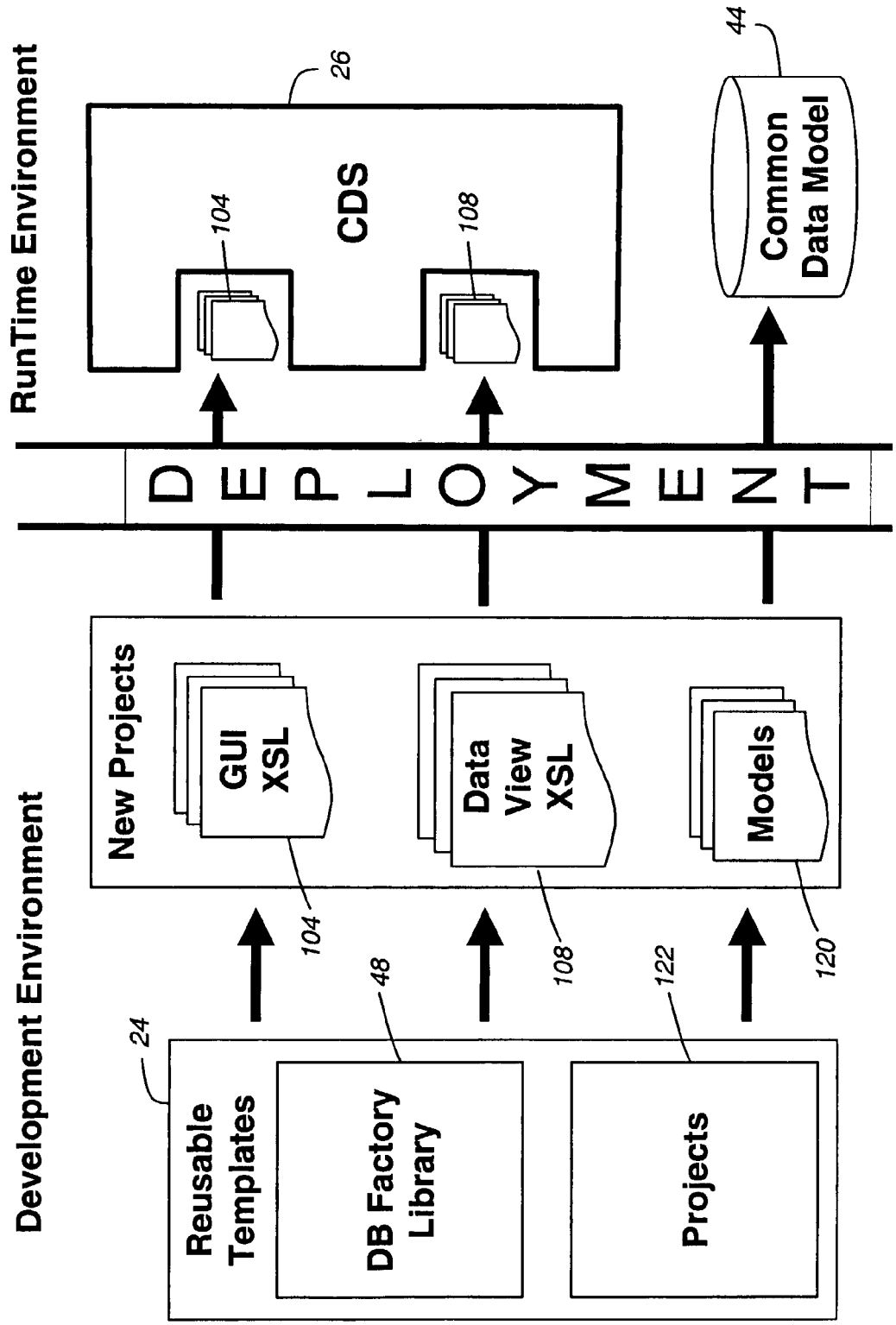
FIG. 4 is a block diagram showing the development environment of the system and its use in developing components for use in the runtime environment of the system.

DMS 10 includes both a development environment and a runtime environment. As shown in FIG. 4, the development environment utilizes the database factory tools 24 to develop the definitional and presentation attributes used for a new data source 42, as well as the data definitions or models 120 needed to support that data source. The data models are then added to the common data model 44. The database factory tools 24 primarily consist of reusable templates that include a library of the database factory parts 48 and a set of previously defined projects 122. The database factory parts 48 can include the definitional information needed by the common data model 44 to enable the creation of CDOs encapsulating the data along with the various properties and methods needed for use of that data. The database factory parts 48 can also include XSL instructions 108 for the data view and XSL definitions 104 used in presenting the data via the web browser 20. These reusable templates or component parts need not be used in every case. Rather, in some instances, new data definitions and/or XSL definitions will need to be newly developed. Thus, for new projects (i.e., for new data sources and/or new application tools being integrated into the system 10), the development environment involves creating the necessary data definitions 120 that can be added to the data model 44, generating the XSL instructions 108 utilized by the view manager 70, and developing, the XSL presentation sheets 104 used by the GUI manager 80, with the developer utilizing the reusable templates where possible and creating any remaining needed data and XSL definitions. Once these have been developed, they are deployed by updating the common data model 44 and incorporating the XSL definitions into the CDS 26 for use in the runtime environment. Where needed, the development environment can also include the development of new plug-ins and properties files as needed for use of the new data source and/or applications tools.

Figure 5:
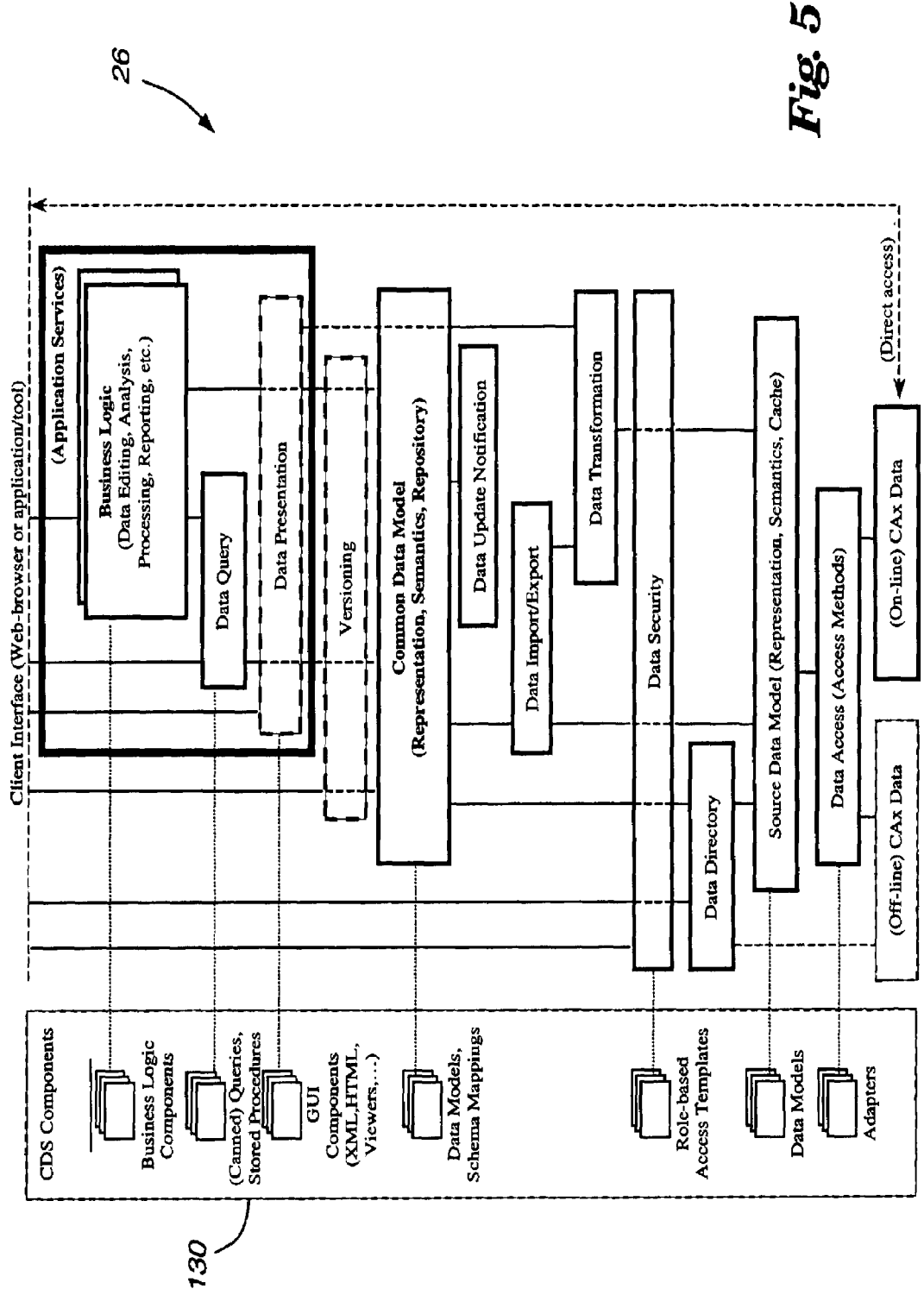
FIG. 5 is a hierarchical diagram of the various common data services used by the system of FIG. 1 along with their corresponding runtime components.

Referring now to FIG. 5 a hierarchical view of the common data services 26 is shown along with the CDS components 130 used by those services. These components essentially comprise the data required for operation of the database management system 10 (as opposed to the engineering data from the data sources 42), and it will be understood that depending upon the actual implementation of the DMS 10 not all of these components may be required. These components 130 include reusable components that can be maintained as a part of the database factory library 48. Some components, such as the business logic components and perhaps the queries and stored procedures, may be substantially database-independent, whereas others, such as the source data models and source properties files used by the adapter managers will typically be database-specific. CAx in the figure denotes computer aided engineering data that the CDS has access to.

As shown, there are various parallel paths (the vertical lines) that may be utilized for data access. For higher level functions involving the data, various application services included within the common data services 26 may be utilized, including the application of business logic, queries, or specific presentation formats to the data. Most access is conducted through the use of CDOs using the common data model 44, although as shown in some instances data access might be more direct, using only the security manager 76 and lower level data services (data directory and models). Furthermore, direct access by specific application tools to their databases may be provided, with the CDOs being used for other applications and browser access.

Figure 6:
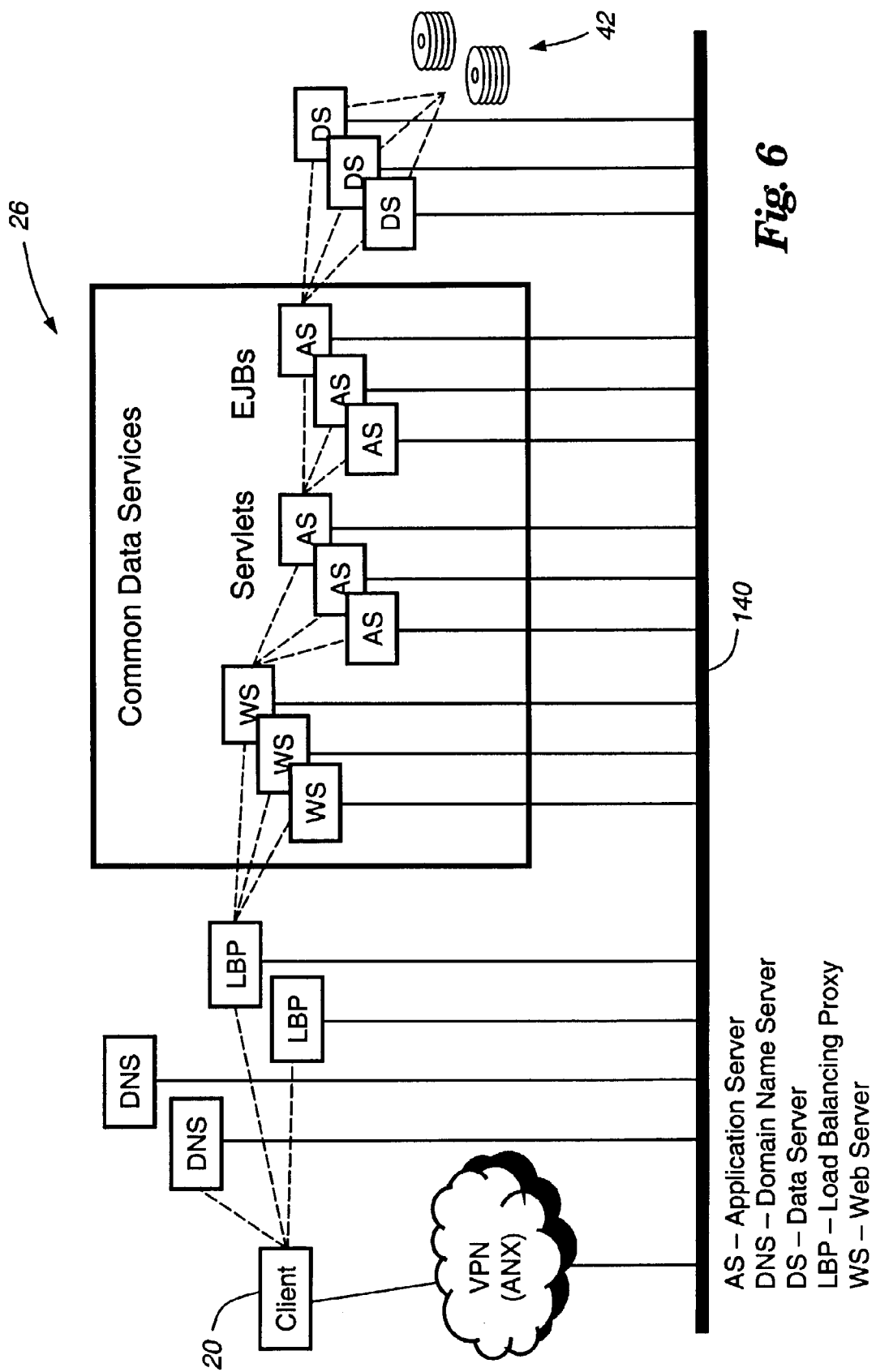
FIG. 6 is a block diagram depicting the physical architecture of the system.

FIG. 6 depicts a network topology that can be used in implementing DMS 10. The solid lines represent network connections with a private network 140, whereas the broken lines represent communication paths for the client 20 through the various levels of servers to the data sources 42. For access from the client 20 to the network 140 via a public network such as the Internet, a VPN (virtual private network) can be used, with the domain name servers (DNS) being used to route the client to the appropriate web server (WS). If desired, load-balancing proxy servers (LBP) can be used to spread the traffic across multiple servers. DMS 10 can itself be implemented using a multi-tiered server approach using web servers to handle HTTP communication with the clients, servlet application servers (AS) for server request processing, and enterprise javabean application servers (EJB AS) to implement the common data services 26. As will be appreciated by those skilled in the art, the domain name servers (DNS), load balancing proxy servers (LBP), and data servers (DS) can each be implemented in one or more ways known in the art. VPN communication strategies and software are also well known in the art. Similarly, the common data servers (WS, servlet AS, and EJB AS) can also be implemented to carry out the common data services 26 and web services 30 discussed herein and appropriate hardware and software systems to accomplish this well known in the art.

Figure 7:
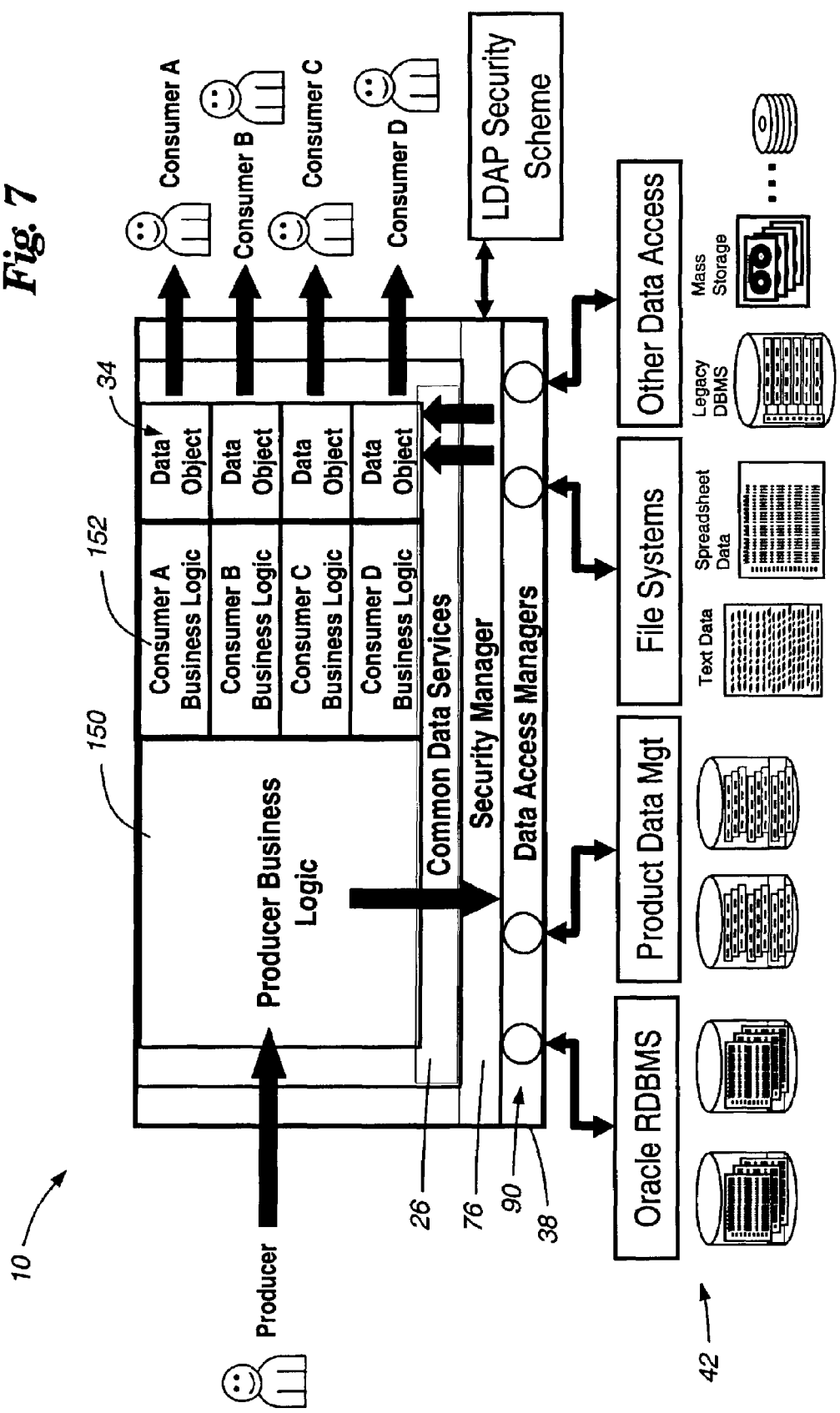
FIGS. 7 and 8 depict the data flows through the common data services of the system for producer and consumer data access, as well as for data flows to and from engineering applications.
Figure 8:
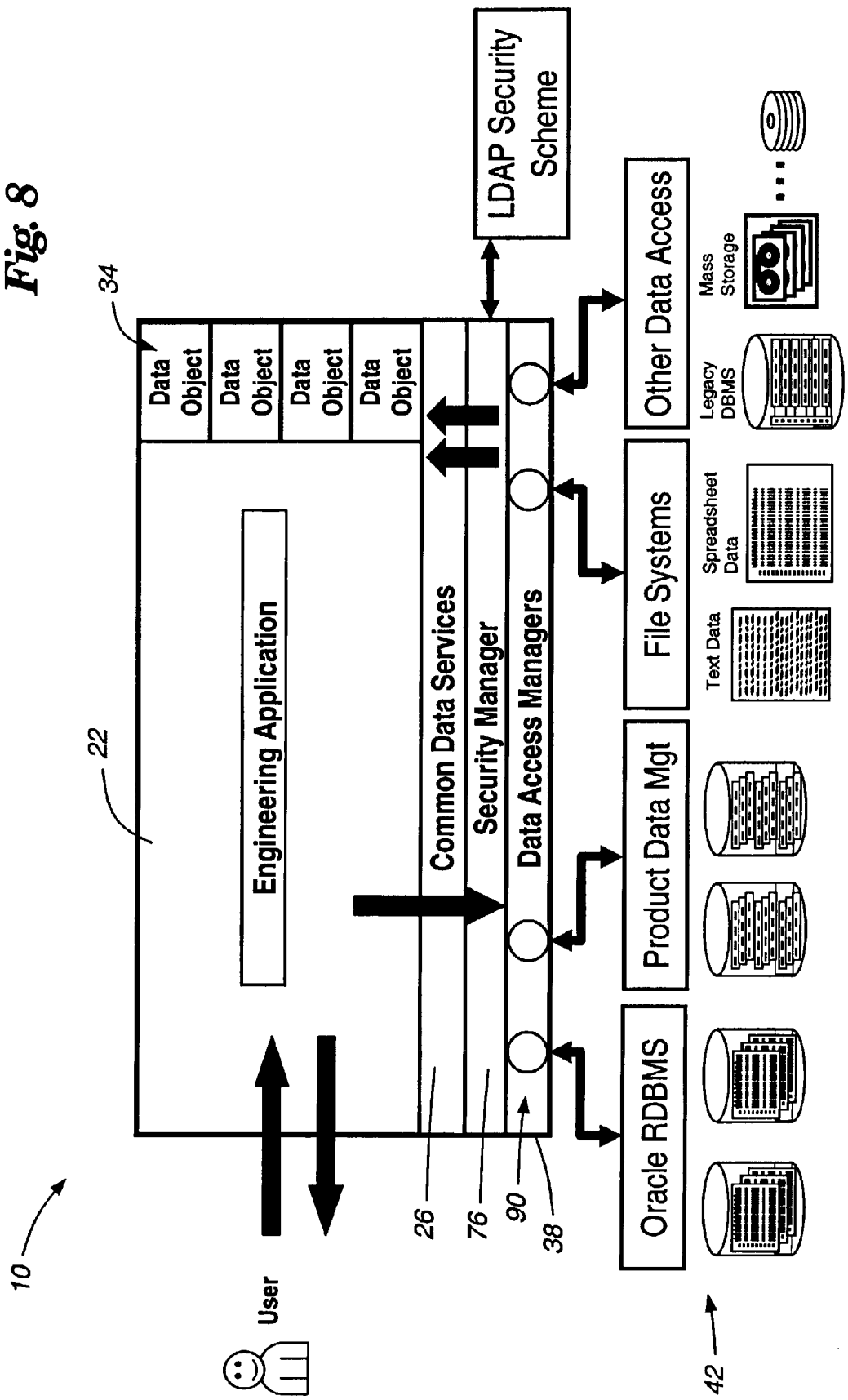

FIG. 7 provides a diagrammatic representation of the encapsulation by the common data services 26 of the business logic 150, 152 utilized by the system for both engineering data producers and engineering data consumers. Producer data is received by the system 10 and processed through the common data services 26, including in particular the security manager 76, and is supplied to the appropriate database(s) via the data access manager 38 using plug-ins 90. Consumer data requests are also processed through these common data services 26 and are handled as CDOs 34 using the particular business logic 152 applicable to the particular user request received by the system. Similarly, as shown in FIG. 8, end user access by way of an engineering application 22 is also routed through the common data services 26 which uses the CDOs as object wrappers for the data accessed via the data access managers 38. Although not shown in FIG. 8, the engineering application can be provided within a virtual product engineering (VPE) environment so that the data flows to and from the engineering application are by way of the managed VPE environment.

Figure 9:
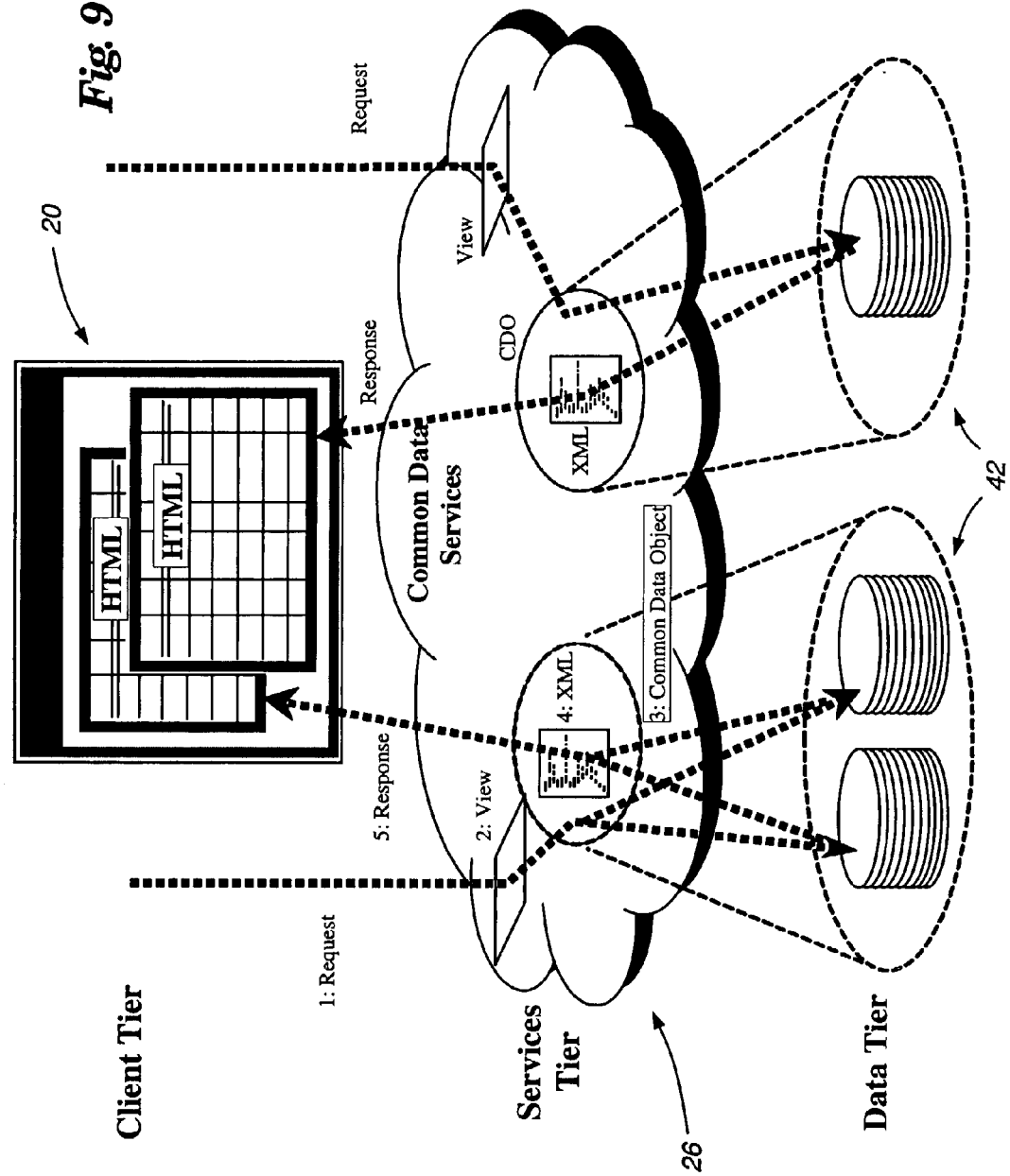
FIG. 9 shows the processing steps utilized by the system in response to a data request from an end user.

The data access methodology described above and used by DMS 10 is depicted in FIG. 9. In particular, data access begins with a request (1) for data. Under control of the data services coordinator 32, the view manager 70 determines what data view (2) (i.e., CDO) is required using the data definitions from the common data model 44. It then instantiates one or more CDOs (3) using the requested data obtained from one or more of the data sources 42. The data is then represented using XML (4) and returned to the user for display (5).

Figures 10, 11:
FIGS. 10-13 are exemplary screen shots of the browser-based user interface of the system.

Exemplary browser screen displays are depicted in FIGS. 10-13. Browser access to data via DMS 10 can be implemented using a typical website paradigm requiring login through the browser that utilizes the security manager services to authorize access. Protocols such as secure socket layers can be used to protect and authenticate accesses to the system once the user has been authorized, and browsers such as Internet Explorer™ or Netscape Communicator™ include the capability to support such protective communication protocols. The screen displays depicted in these figures each represent a frame contained within the client window of the browser. Additional frames can be used such as a left vertical menu that enables navigation through various levels in the website hierarchy. FIG. 10 depicts a forms interface 160 which can be used for queries of the tire database 54 shown in FIGS. 1 and 2. This form can be a reusable GUI component that provides an interface to one of a number of CDS component queries shown in FIG. 5, and the form itself is made up of reusable components (fill-in text fields, drop-down boxes, tables, submit buttons) contained with the database factory library. The query results shown in FIG. 11 are returned as HTML and presented in a table format using, for example, business logic to sort them by tire size. The returned data includes finite element model drawings which may be located in an entirely different database than the other data presented in the table so that it will be appreciated that the data location is entirely transparent to the user. Clicking on any of the FEM links will access that image data and present it on a subsequent screen.

Figures 12, 13:
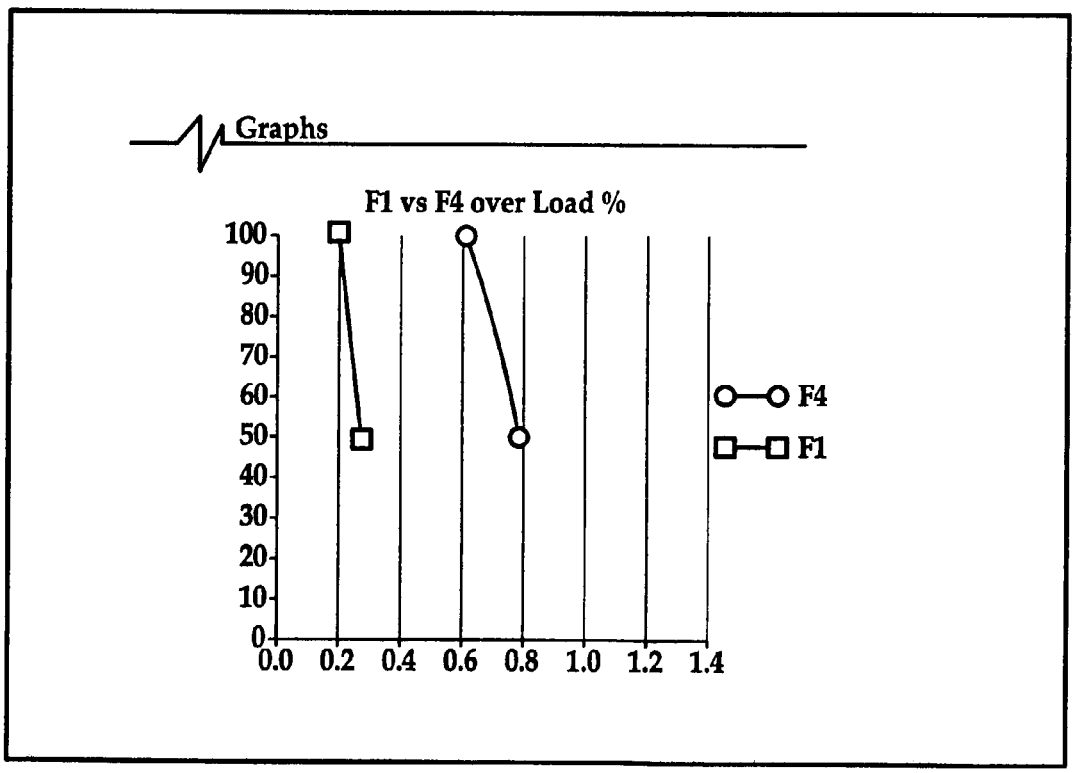

Similarly, the detailed test data files identified by the different Test Ids are also available through this same browser interface, even though they may be stored in a proprietary format of the particular software tools used to record that test data. The test data for the identified test can be viewed, as shown by the display of FIG. 12, thereby allowing the user to dig down into the actual test data and results. The returned data can also be plotted as shown in FIG. 13, which is accomplished by selecting one of the graph icons in FIG. 12. For this, the system uses the graph GUI plug-in of FIG. 2 to generate the display of this data. In this way, the plotting of data is always available regardless of the origins of that data.

Figures 14, 15:
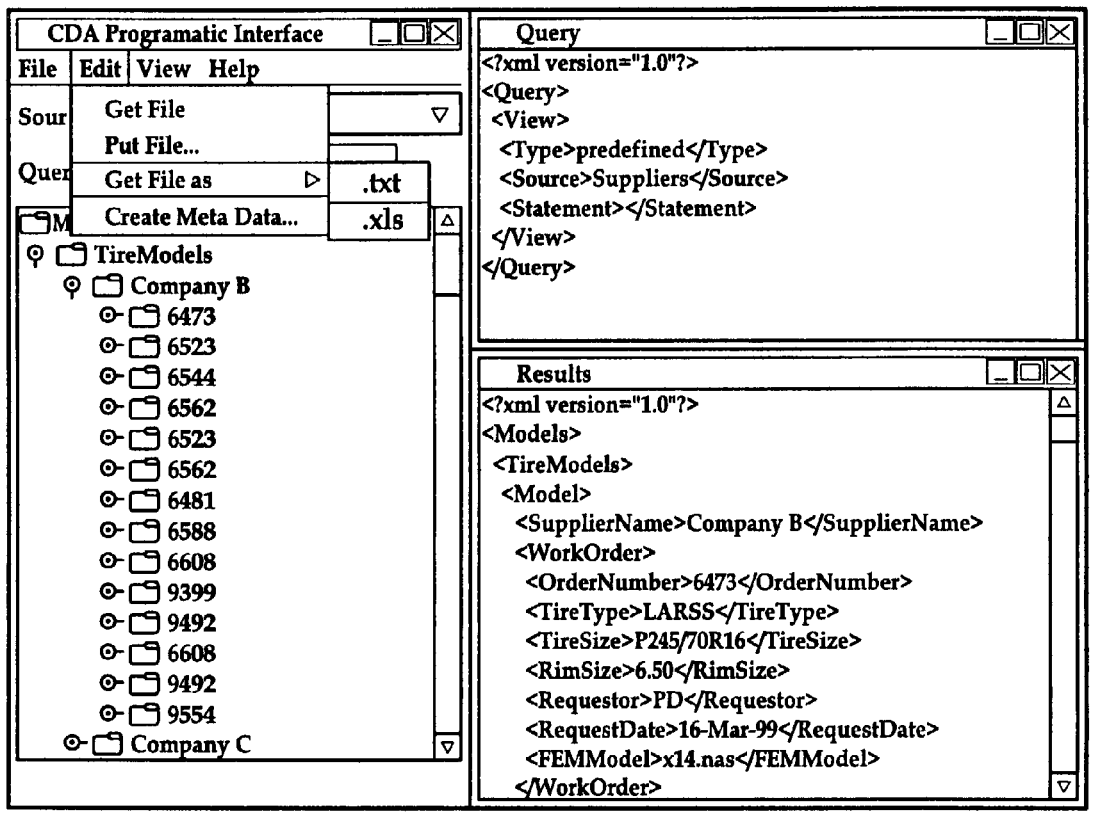
FIG. 14 shows the use of the system of FIG. 1 to enable data access through an engineering application program.
FIG. 15 shows a set of exemplary exported data opened in a conventional, off the shelf spreadsheet application.

FIG. 14 shows how a user can access data through the system 10 from within a CAx (i.e., CAD, CAE, CAM, etc.) application using the API 28 written in, for example, Java. The query is implemented in XML (as shown in the upper right pane), and the results returned also in XML (lower right pane). As described above, DMS 10 supports data translation so that, for example, the API 28 can include a translation command such as "Get File As .xls" with the translation manager then translating the data into Excel™ format and providing a "Save As" dialog box so that the user can save the .xls file for subsequent use from within Excel™, as shown in FIG. 15.

It will thus be apparent that there has been provided in accordance with the present invention a data management system which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

The invention claimed is:

1. A data management system for use in accessing a plurality of data sources having data stored in different formats, comprising:
    a computer network including a group of two or more computers interconnected to each other such that they can exchange data over a communications path;
    a common data model stored on one or more of the computers and including a data class having a plurality of attributes defining properties of the data class;
    a plurality of service managers including at least a data access manager and an ancillary service manager, wherein the data access manager is operable to access the common data model and to access data from one or more of the data sources for use in instantiating a common data object containing the accessed data, and wherein the ancillary service manager is operable to provide a data service function; and
    a data services coordinator responsive to requests for access to data available from one or more of the data sources, wherein the data services coordinator is operable to coordinate operation of at least some of the service managers in creating and utilizing the common data object to supply the requested data.

2. A data management system as defined in claim 1, wherein the service managers and data services coordinator each comprise at least one computer program stored on one or more of the computers.

3. A data management system as defined in claim 1, wherein the common data model includes information concerning global logical and physical data definitions, mapping to and from local data source models, and the location of various data sources and data items stored in the data sources.

4. A data management system as defined in claim 1, wherein the data class includes a plurality of subclasses, each of which is directed to one or more specific data structures.

5. A data management system as defined in claim 1, wherein the common data model is implemented using an object oriented modeling language.

6. A data management system for use in accessing a plurality of data sources having data stored in different formats, comprising:
    a computer network including a group of two or more computers interconnected to each other such that they can exchange data over a communications path;

a common data model stored on one or more of the computers and including a data class having a plurality of attributes defining properties of the data class;

a plurality of service managers including at least first and second data access managers and an ancillary service manager, wherein the data access managers include a data view manager and a data source adapter manager at least one of which is operable to access the common data model and at least one of which is operable to access data from one or more of the data sources for use in instantiating a common data object containing the accessed data, and wherein the ancillary service manager is operable to provide a data service function; and a data services coordinator responsive to requests for access to data available from one or more of the data sources, wherein the data services coordinator is operable to coordinate operation of at least some of the service managers in creating and utilizing the common data object to supply the requested data.

7. A data management system as defined in claim 6, wherein the data view manager is operable to instantiate the data class in response to a request to obtain data from one or more of the data sources to thereby create the common data object containing the requested data.

8. A data management system as defined in claim 6, wherein the data source adapter manager is operable to control the extraction of data from at least one of the data sources for use by the data view manager in creating the common data object.

9. A data management system as defined in claim 6, wherein the data source adapter manager is operable to control the storage of data in at least one of the data sources.

10. A data management system as defined in claim 6, wherein the data source adapter manager comprises a first data source adapter manager and wherein the data management system further comprises a second data source adapter manager, the first adapter manager being operable to control the extraction of data from a first type of data source and the second adapter manager being operable to control the extraction of data from a second type of data source.

11. A data management system as defined in claim 10, wherein the first type of data source is a relational database and the first adapter manager is operable to control the extraction of data from the relational database.

12. A data management system as defined in claim 6, further comprising a set of view manager interface modules, at least one of which interfaces the data source view manager with the adapter manager.

13. A data management system as defined in claim 6, further comprising a set of adapter interface modules, each of which permits the adapter manager to be interfaced to at least one of the data sources.

14. A data management system as defined in claim 6, wherein the data source view manager includes data properties information used in instantiating the common data object.

15. A data management system as defined in claim 6, wherein said data view manager is operable to provide a meta-data management function that enables creation, update, deletion, and retrieval of the attributes of the data class used in the common data model.

16. A data management system as defined in claim 6, wherein said data source adapter manager is operable to provide a source data management function that enables creation, update, deletion, and retrieval of data in the data sources.

17. A data management system as defined in claim 1, wherein the data service function comprises one or more of the following services:
   data versioning,
   data transport,
   data update notification,
   data security,
   data presentation, or
   data translation.

18. A data management system as defined in claim 1, wherein the ancillary service manager comprises an audit manager that handles data versioning and/or data update notifications concerning data available from at least some of the data sources.

19. A data management system as defined in claim 1, wherein the ancillary service manager comprises a transport manager that enables data transfer between computers on the computer network using a communications protocol.

20. A data management system as defined in claim 1, wherein the ancillary service manager comprises a data security manager that handles authentication and authorization of the requests to access data.

21. A data management system as defined in claim 1, wherein the ancillary service manager comprises a GUI manager that controls the presentation of the accessed data via a web interface.

22. A data management system as defined in claim 1, wherein the ancillary service manager comprises a portal manager that controls the presentation of the accessed data via a web interface using user-customized information.

23. A data management system as defined in claim 1, wherein the ancillary service manager comprises a translation manager that enables the accessed data stored in the common data object to be convened to one or more standardized or proprietary formats.

* * * * *